United States Patent
Lu et al.

(10) Patent No.: US 7,735,314 B2
(45) Date of Patent: Jun. 15, 2010

(54) EXHAUST AFTER-TREATMENT SYSTEM WITH FLOW CONTROL FOR OPTIMUM TEMPERATURE CONDITIONS

(75) Inventors: Qilong Lu, San Antonio, TX (US); Yiqun Huang, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 350 days.

(21) Appl. No.: 11/754,153

(22) Filed: May 25, 2007

(65) Prior Publication Data
US 2008/0289321 A1    Nov. 27, 2008

(51) Int. Cl.
*F01N 3/00*   (2006.01)
(52) U.S. Cl. .............................. 60/287; 60/288; 60/292; 60/295; 60/297
(58) Field of Classification Search ................... 60/287, 60/288, 297, 292, 295, 324
See application file for complete search history.

(56) References Cited

U.S. PATENT DOCUMENTS

| 5,900,043 | A | * | 5/1999 | Grandjean et al. | 95/29 |
| 5,974,791 | A |   | 11/1999 | Hirota et al. | 60/276 |
| 6,568,179 | B2 |   | 5/2003 | Deeba | 60/298 |
| 6,615,580 | B1 |   | 9/2003 | Khair et al. | 60/286 |
| 6,718,757 | B2 |   | 4/2004 | Khair et al. | 60/286 |
| 6,871,490 | B2 |   | 3/2005 | Liang et al. | 60/286 |
| 6,948,310 | B2 |   | 9/2005 | Roberts, Jr. et al. | 60/285 |
| 2006/0096281 | A1 | * | 5/2006 | Huang | 60/297 |
| 2007/0199311 | A1 | * | 8/2007 | Kalish | 60/295 |
| 2007/0294999 | A1 | * | 12/2007 | Yoshizaki et al. | 60/274 |

FOREIGN PATENT DOCUMENTS

| GB | 2 418 377 A | 3/2006 |
| JP | 2004 346794 A | 12/2004 |

* cited by examiner

*Primary Examiner*—Thomas E Denion
*Assistant Examiner*—Audrey Klasterka
(74) *Attorney, Agent, or Firm*—Chowdhury & Georgakis PC

(57) ABSTRACT

A diesel engine exhaust treatment system has both a NOx reduction device and a diesel particulate filter. The system is designed to ensure that the NOx reduction device operates within its optimal temperature conditions. Using exhaust flow control valves, the exhaust flow can be directed into either the NOx reduction device first or into the diesel particulate filter first, and then into the other device, before exiting out the tailpipe.

10 Claims, 5 Drawing Sheets

EXHAUST AFTER-TREATMENT SYSTEM WITH FLOW CONTROL FOR OPTIMUM TEMPERATURE CONDITIONS

TECHNICAL FIELD OF THE INVENTION

This invention relates to automotive emissions control, and more particularly to control of exhaust temperature into emissions control devices.

BACKGROUND OF THE INVENTION

To meet upcoming diesel emissions regulations, a 4-way catalyst exhaust after-treatment system has been widely accepted for light-duty and heavy-duty diesel engines. The 4-way catalyst system is composed of a diesel Oxidation Catalyst (DOC), a diesel particulate filter (DPF), and a lean NOx trap (LNT) or selective catalytic reduction (SCR) device. The DPF can be catalyzed or non-catalyzed. This combination of devices is called a "four-way catalyst" system because in addition to converting carbon monoxide, hydrocarbons and nitrogen oxides, it reduces the amount of soot particles, as a fourth component.

In a 4-way catalyst exhaust after-treatment system, performance of each component is significantly dependent on its temperature. In particular, a LNT requires a certain temperature window as well as favorable upstream exhaust compositions to obtain optimal NOx adsorbent capacity. However, conventional 4-way catalyst exhaust after-treatment systems cannot meet LNT temperature requirements under all engine operating conditions.

DETAILED DESCRIPTION OF THE INVENTION

The following description is directed to a 4-way catalyst exhaust after-treatment system for thermal management of nitrogen oxide (NOx) reduction devices such as a Lean NOx Trap (LNT) or Selective Catalyst Reduction (SCR) device. Various control strategies enable the NOx reduction device to work within its most efficient temperature window.

The system ensures that the NOx reduction device will work within its most effective temperature window under various engine operating conditions. For purposes of this description, a LNT is used as an example of the NOx reduction device. However, each of the methods and systems described herein could alternatively use an SCR or other NOx reduction device.

Figure 1:
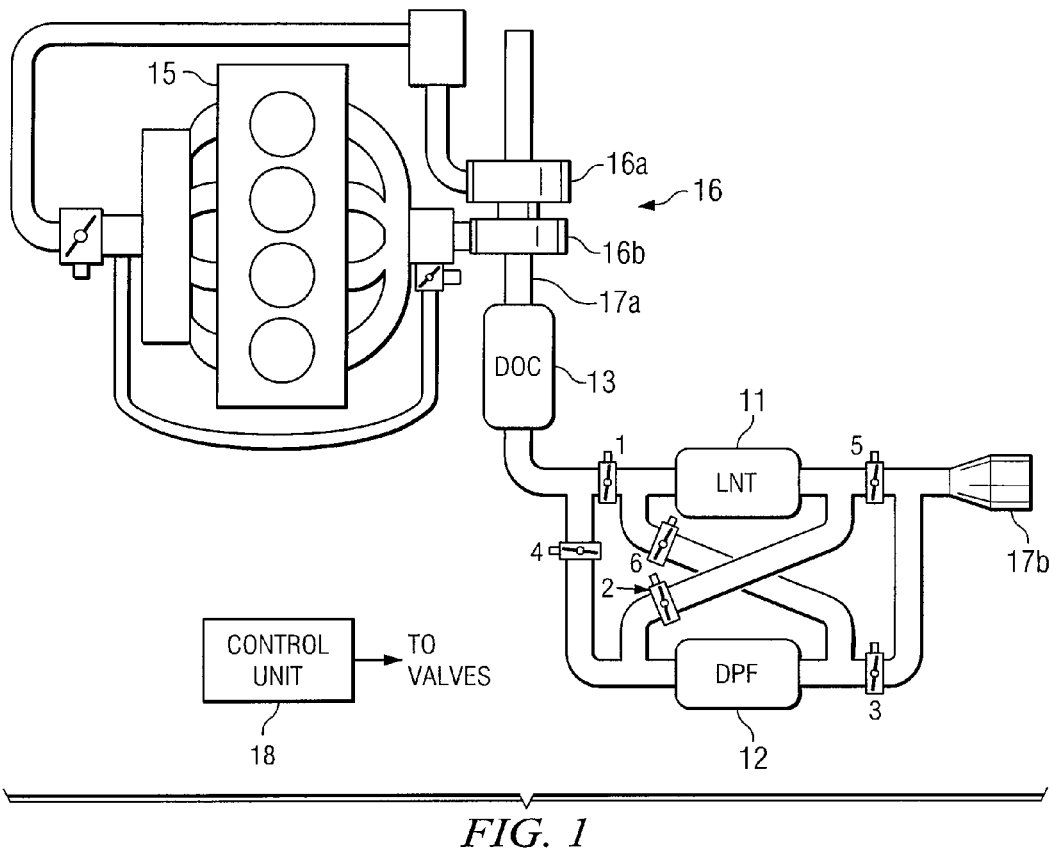
FIG. 1 illustrates one embodiment of an exhaust after treatment system in accordance with the invention.

FIG. 1 illustrates one embodiment of an exhaust treatment system in accordance with the invention. System 10 is a 4-way catalyst system, having a lean NOx trap (LNT) 11, a diesel particulate filter (DPF) 12, and a diesel oxidation catalyst (DOC) 13. The engine 15 may be any type of diesel engine. It is equipped with a turbocharger 16, having a compressor 16a and turbine 16b.

An exhaust pipe section 17a carries exhaust from the exhaust manifold of the engine. In the embodiment of FIG. 1, where engine 15 has a turbocharger 16, the exhaust enters pipe section 17a via the turbine 16b. The DOC 13 is located on pipe section 17a.

Downstream of DOC 13, the exhaust line divides into two paths. The LNT 11 is on one path, and the DPF 12 is on the other. The two paths reunite prior to the exhaust tailpipe 17b. As explained below, the flow sequence of exhaust into the LNT 11 and DPF 12 can be swapped by changing their relative position in the exhaust flow.

A control unit 18 may be implemented with conventional processing and memory devices. Control unit 18 may be a "stand alone" device dedicated to implementing the methods described herein, or may be part of a more comprehensive control system for the engine or exhaust system.

As explained below in connection with FIG. 12, control unit 18 is programmed to receive temperature data and other data representing conditions associated with system 10, such as whether the NOx reduction device requires desulfation or whether the diesel particulate filter requires regeneration. Depending on these conditions, control unit 18 operates valves (identified as Valves 1-6), which determine whether exhaust will flow first into LNT 11 or first into DPF 12.

For a particular LNT and particular conditions associated with the LNT, an effective temperature window with upper and lower temperature limits can be determined. These temperature limits can be stored in control unit 18 and used as trigger criteria for determining the exhaust flow path. The exhaust flow path is also event-driven, in the sense that the need for LNT desulfation or DPF regeneration can act as additional trigger criteria.

Diesel Oxidation Catalyst

As illustrated in FIG. 1, DOC 13 is positioned close to the outlet of the turbine 16b. There are several reasons for placing DOC 13 at the upstream of DPF 12 and LNT 11.

First, although engine-out NOx emissions are composed mostly of nitric oxide (NO) (typically 85-95% vol.), an oxidization of NO to nitrogen dioxide ($NO_2$) occurs over DOC 13. $NO_2$ can be much more efficiently adsorbed by a LNT than NO. Therefore, the LNT capacity is improved with an upstream DOC 13.

Second, a DOC can oxidize unburned hydrocarbons (HC), carbon monoxide (CO), and organic fraction of diesel particulates (SOF). All these chemical reactions are exothermic, which increases the temperature of exhaust flowing through DOC 13.

Third, DOC 13 can help prevent LNT 11 from face plugging. During an engine cold start or a long idling period in cold weather, liquid condensate from unburned hydrocarbon and water in exhaust stream agglomerates together with engine-out particles. The process can form wet soot agglomerates that may accumulate and deposit on the face of the LNT 11. DOC 13 has stronger oxidation ability and a lower activation temperature than LNT 11. Thus, DOC 13 can help prevent LNT 11 from face plugging during cold start or long idling periods in cold weather when it is located ahead of LNT 11.

Furthermore, when LNT desulfation is needed, placing DOC 13 ahead of LNT 11 can greatly reduce the axial temperature gradients of LNT 11 during desulfation.

Figure 2:
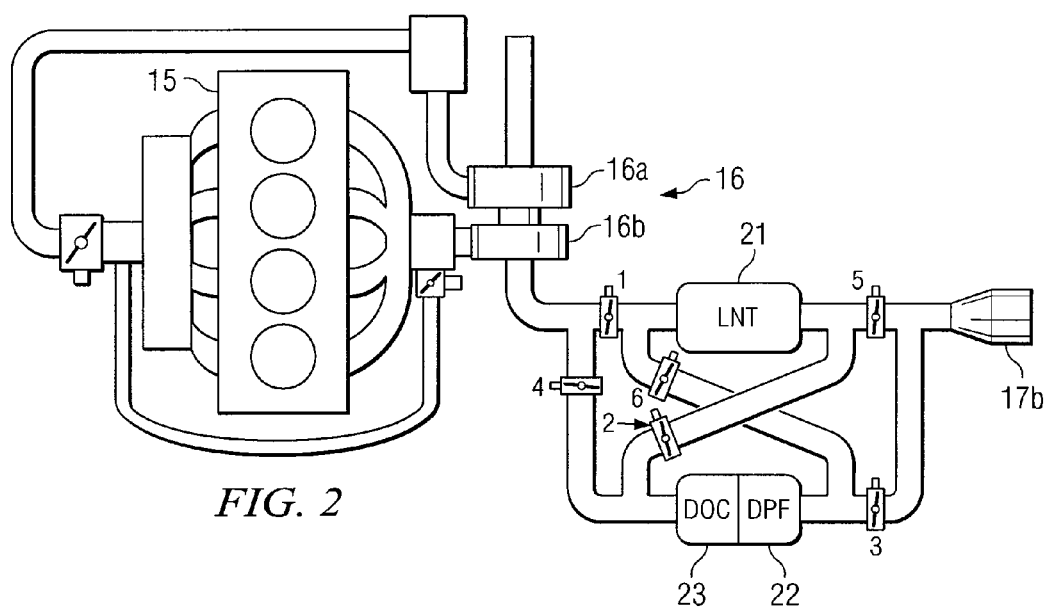
FIG. 2 illustrates an alternative location of the diesel oxidation catalyst.

FIG. 2 illustrates an alternative location of the DOC. As illustrated, DOC 23 can be placed on the exhaust path having DPF 22, and can be combined together with DPF 22 as a single unit.

Figure 3:
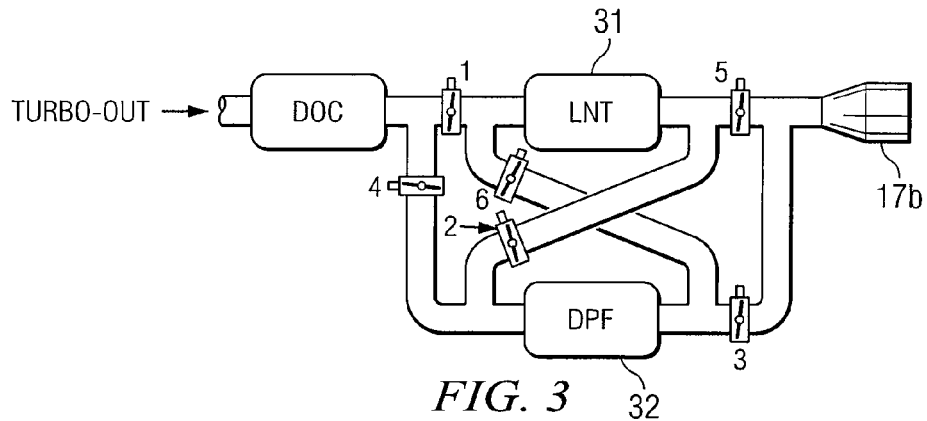
FIG. 3 illustrates a parallel configuration of the exhaust treatment system.
Figure 4:
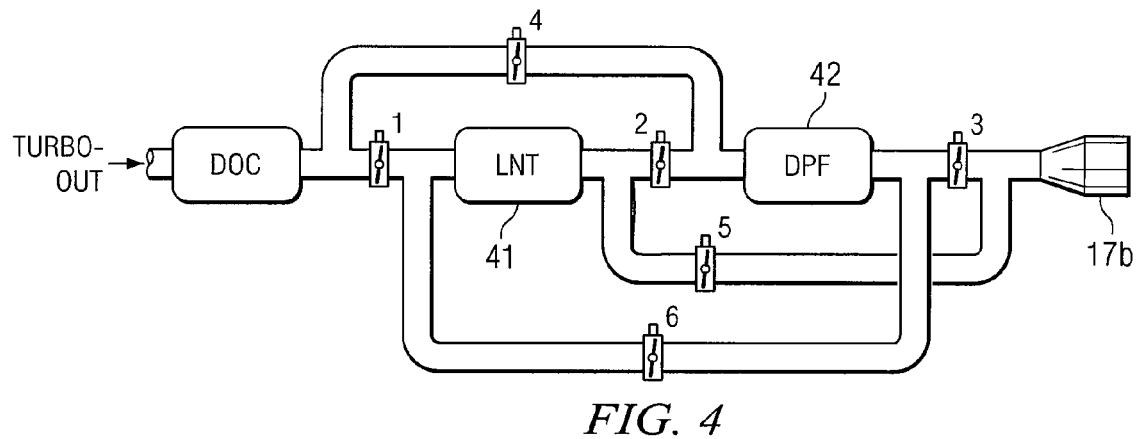
FIG. 4 illustrates a serial configuration of the exhaust treatment system.

FIGS. 3 and 4 illustrate how a 4-way catalyst exhaust after-treatment system can be implemented in either a parallel or serial configuration. Each embodiment allows exhaust flow to be controlled so that it passes through both the LNT and DPF, but with the order of flow reversible. To this end, the parallel configuration has two crossover paths, and the serial configuration has bypass and reverse flow paths.

FIG. 3 illustrates an example of a parallel configuration. LNT 31 is on a first branch, and DFP is on a second branch, in a parallel pattern. A first crossover path may be used to direct exhaust from the output of the LNT to the input of the DPF. A second crossover path may be used to direct exhaust from the output of the DPF to the input of the LNT.

FIG. 4 illustrates a serial configuration. LNT 41 is located in series with DPF 42 on a main exhaust line. The exhaust flow path is created by using bypass lines around the LNT 41 or DPF 42. Also, a reverse flow path goes from the output of the downstream device (here the DPF) to the input of the upstream device (here the LNT).

In both FIGS. 3 and 4, six exhaust control valves 1-6 are used to regulate exhaust flow. They can be any type of ON/OFF valves as long as they can tolerate high temperatures up to 1000° C. They can be driven mechanically, pneumatically, or electrically and are controlled by a control unit, such as control unit 18 of FIG. 1. The use of individual ON/OFF valves provides flexibility for the exhaust system arrangement and reduces implementation difficulties.

Figure 5:
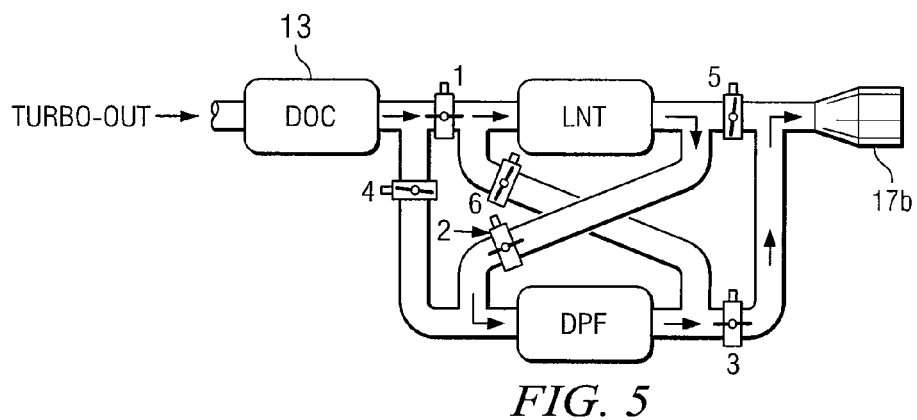
FIG. 5 illustrates the parallel configuration with exhaust flowing first into the lean NOx trap.
Figure 6:
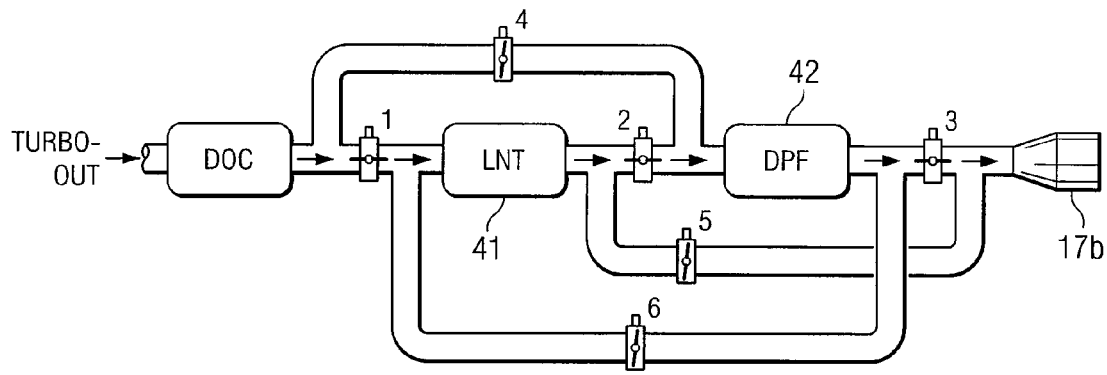
FIG. 6 illustrates the serial configuration with exhaust flowing first into the lean NOx trap.

FIGS. 5 and 6 illustrate, for the parallel and serial configurations, respectively, exhaust control valve 1, 2, and 3 open and valves 4, 5, and 6 closed. The exhaust behind DOC 13 will flow through LNT first and then through DPF to tail pipe. The exhaust flow path can be described as TurboOut-DOC-LNT-DPF.

Figure 7:
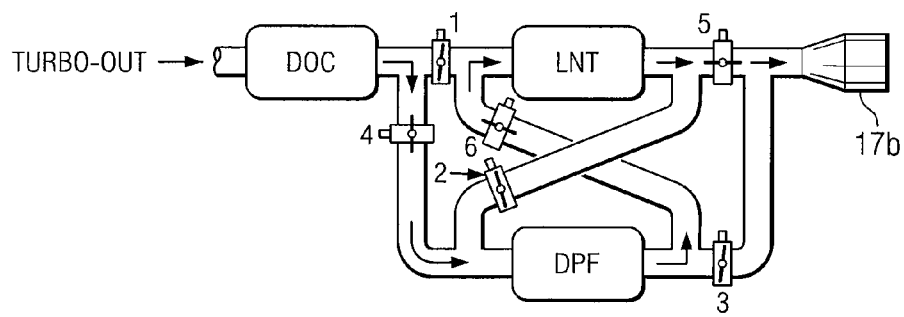
FIG. 7 illustrates the parallel configuration with exhaust flowing first into the diesel particulate filter.
Figure 8:
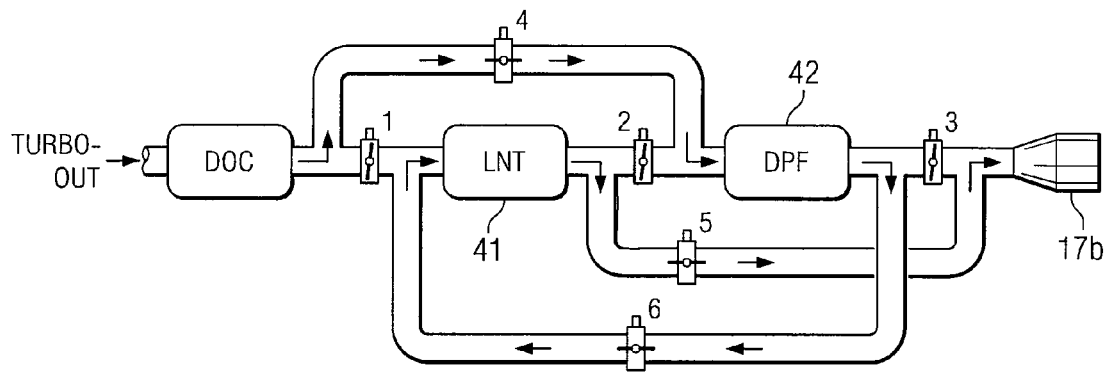
FIG. 8 illustrates the serial configuration with exhaust flowing first into the diesel particulate filter.

FIGS. 7 and 8 illustrate, for the parallel and serial configurations, respectively, exhaust control valves 4, 5, and 6 open and valves 1, 2, and 3 closed. The exhaust at the downstream of DOC flows through the DPF first, then through the LNT, then out the tail pipe. The exhaust flow path can be described as TurboOut-DOC-DPF-LNT.

The various configurations are designed such that the LNT and DPF have the same flow inlet and outlet regardless of whether exhaust flows through LNT first and then DPF or through DPF first and then LNT. The same flow direction through LNT and DPF is important to obtain their optimal performance.

Figure 9:
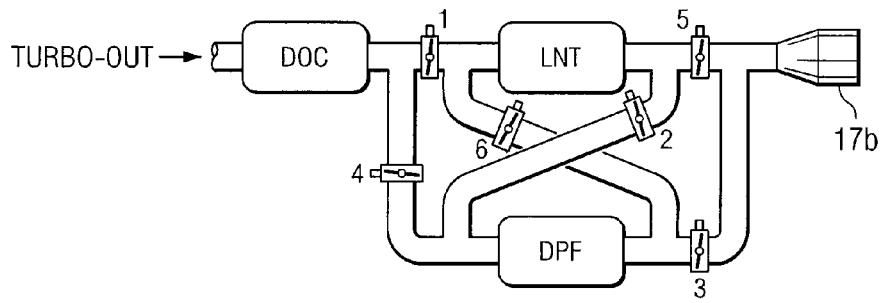
FIG. 9 illustrates alternative valve locations for the parallel configuration.
Figure 10:
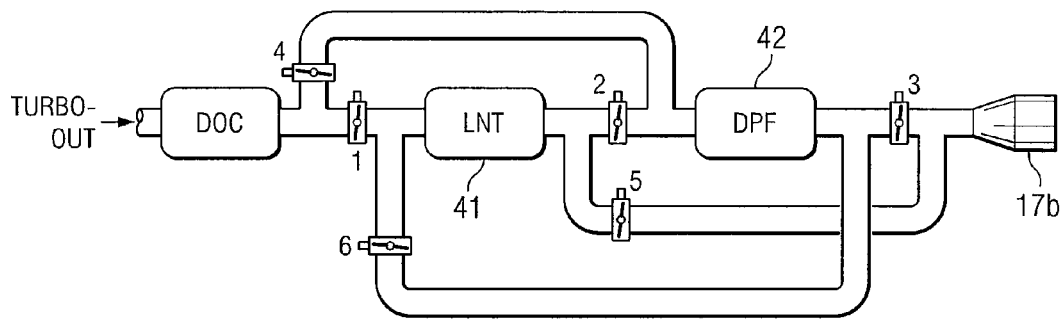
FIG. 10 illustrates alternative valve locations for the serial configuration.

Some valve positions can be adjusted in the system. FIGS. 9 and 10 illustrate, for the parallel and serial configurations, respectively, an example of changing positions of exhaust control valve 4, 6, and 2. These configurations have the same functionality of the systems described in FIGS. 3 and 4.

System Calibration

The lengths of the various exhaust passage pipes may be influenced by overall engine and vehicle arrangement requirements. In addition, various operational criteria should be met. These criteria are described in terms of the parallel configuration, with reference to FIG. 1, but the same criteria apply to the serial configuration.

Because DOC 13 is required to be close-coupled with the outlet of turbine 16b, the pipe length between turbine out and the DOC inlet should be very short.

The pipe lengths between the DOC outlet and the LNT inlet, between the DOC outlet and the DPF inlet, and between the LNT outlet and DPF inlet should be as short as possible, given that they must be sufficiently long to install the necessary exhaust control valves and passage branch connections.

The pipe length between the DPF outlet and the LNT inlet should be determined carefully. Given the LNT is located at the upstream of the DPF under an engine operating condition, the LNT will be relocated to the downstream of the DPF if the LNT bed temperature is greater than the upper limit of the LNT effective temperature window. After the LNT is moved to the downstream of the DPF, a well-tuned pipe length between the DPF outlet and the LNT inlet ensures that LNT temperature will not be less than the lower limit of the LNT effective temperature window. This pipe length can be further optimized to achieve an LNT temperature not greater than the upper temperature limit even when active soot regenerations occur. The active soot regeneration target temperature is approximately 500° C. for a catalyzed DPF and about 600° C. for a non-catalyzed DPF.

System Control Strategies

To implement the above-described configurations, control unit 18 can be programmed with a control strategy that ensures that the LNT operates in its most effective temperature window under various engine operating conditions. This in turn, ensures optimal NOx adsorbent capacity.

According to NOx requirements of a specific emission standard (e.g. US Tier II Bin 5), an acceptable average tailpipe out NOx target level can be estimated in advance. Then, based on engine-out NOx level under a specific test procedure (e.g. US 06 or FTP 75) required by the emission standard and the LNT NOx adsorbent capacity under a LNT condition, an average required LNT NOx conversion efficiency threshold can be determined.

Dependency curves of NOx conversion efficiency on its bed temperature under various types of LNT conditions (e.g. fresh, de-greened, aged with different sulfur poisoning and desulfation history, etc.) can also be obtained experimentally.

Once the required NOx conversion efficiency threshold and the dependency curves are known, the LNT effective temperature window (ETW), its lower temperature limit, and its upper temperature limit can be determined for each LNT condition.

Figure 11:
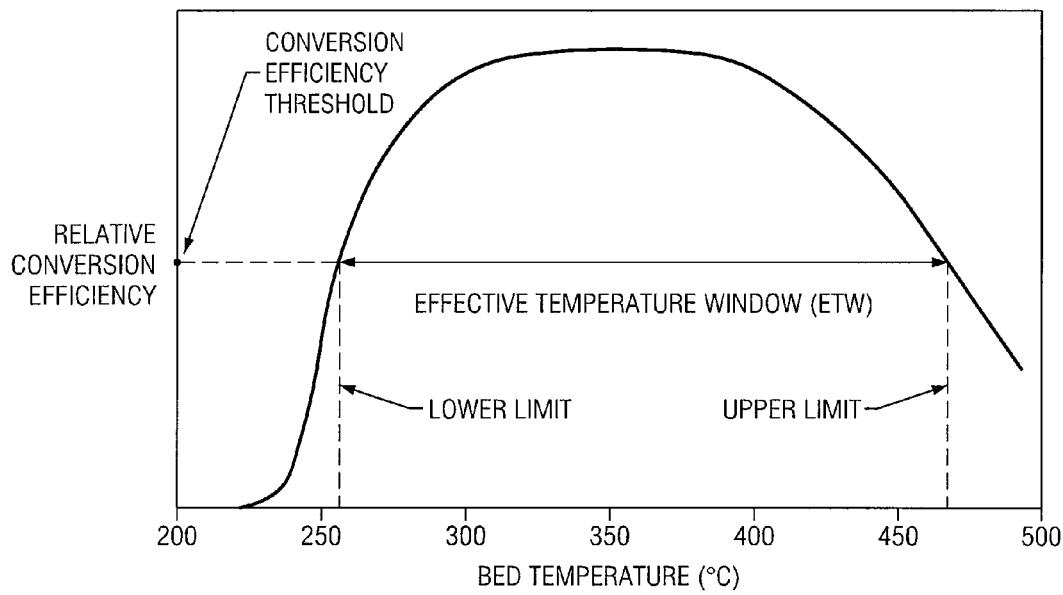
FIG. 11 illustrates the relationship between the efficiency and temperature of a lean NOx trap.

FIG. 11 illustrates the relationship between the temperature and efficiency of a LNT. More specifically, the plot shows one example of determining the ETW and lower and upper temperature limits for a given LNT condition. Similar determinations may be made for other LNT conditions. The dependency curves of NOx conversion efficiency relative to bed temperature vary greatly with different LNT conditions (e.g. fresh, de-greened, and aged with different sulfur poisoning and desulfation history).

Although the exact values of the ETW and lower and upper temperature limits change with the LNT conditions, there is a similarity under all the LNT conditions. Below the lower temperature limit or above the upper temperature limit, LNT conversion efficiency drops significantly. As a result, high NOx emissions will be emitted from the tailpipe.

Figure 12:
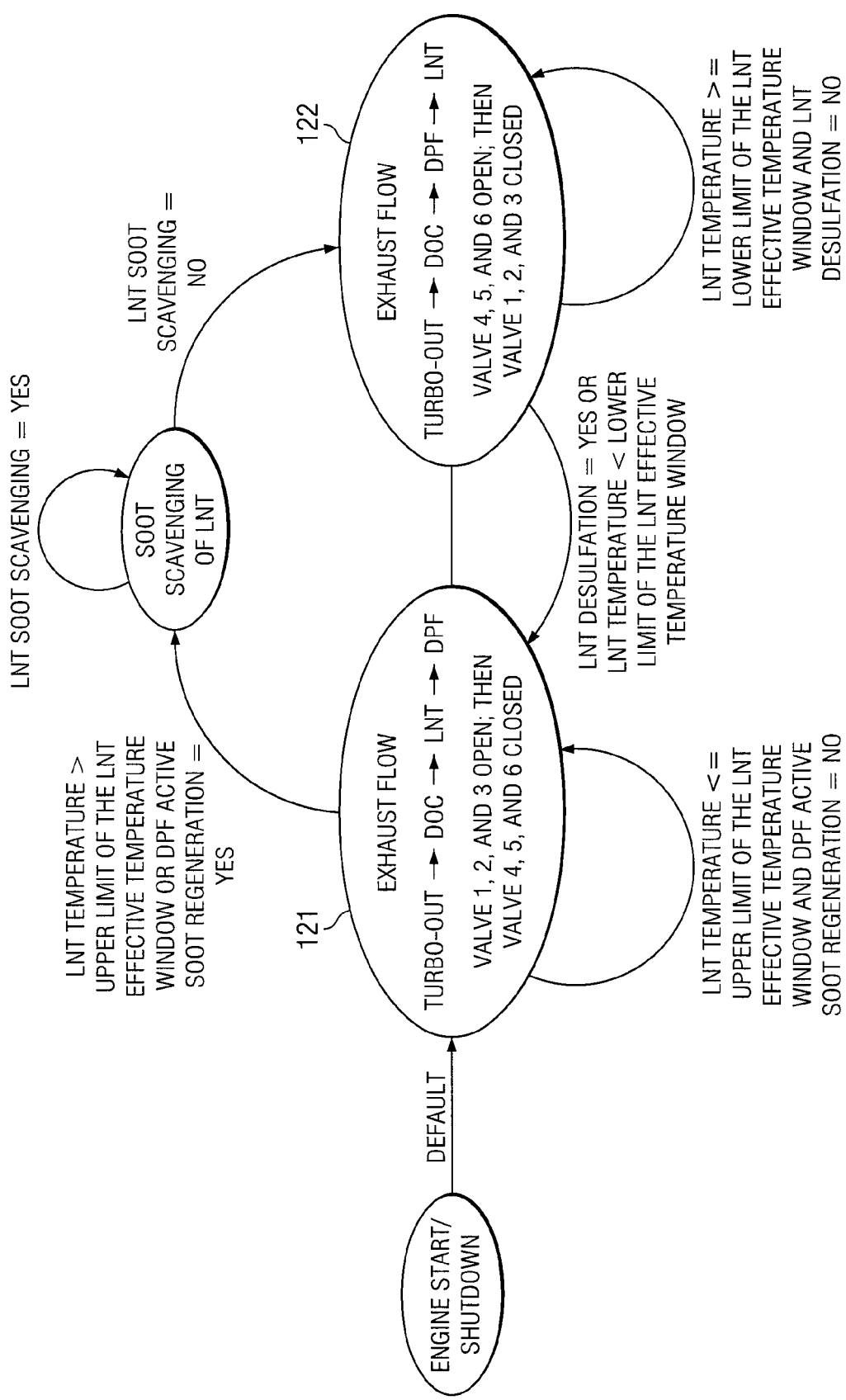
FIG. 12 illustrates a finite state machine (FSM), which represents a method of ensuring that a lean NOx trap operates with its most effective temperature.

FIG. 12 illustrates a finite state machine (FSM), which represents a method of ensuring that the LNT operates in its most effective temperature under various engine operating conditions.

When the engine starts, the exhaust after-treatment system goes into a default state 121, that is, the exhaust control valve 1, 2 and 3 should be open and valve 4, 5 and 6 should be closed. Engine exhaust flows through the path of TurboOut-DOC-LNT-DPF. The exhaust after-treatment system will remain in this state until the LNT temperature is greater than the upper limit of its ETW or an active DPF soot regeneration occurs.

If the LNT temperature is greater than the upper limit of its ETW or if DPF starts conducting an active DPF soot regeneration, then the after-treatment control system will first determine whether a LNT soot scavenging process is needed depending on the previous engine operating conditions. If the soot scavenging process is not needed or done, then the after-treatment control system will open the exhaust control valve 4, 5, and 6 and close valve 1, 2, and 3. And, the exhaust after-treatment system enters a new state 122. In state 122, the LNT and DPF swap their positions in the exhaust flow and engine exhaust flows through the path of TurboOut-DOC-DPF-LNT. The exhaust after-treatment system remains in this state until the LNT temperature goes below the lower limit of its ETW or an LNT desulfation is requested.

Once the LNT temperature becomes lower than the lower limit of its ETW or LNT begins desulfation, then the after-treatment control system will first open exhaust control valve 1, 2, and 3, and close valve 4, 5, and 6. Thus, the exhaust after-treatment system switches to the state 121, in which engine exhaust flows through the path of TurboOut-DOC-LNT-DPF.

When engine shuts down, the after-treatment control system will open exhaust control valve 1, 2, and 3, and close valve 4, 5, and 6 no matter whichever state the exhaust after-treatment system is in at that moment.

The invention claimed is:

1. An exhaust after-treatment system (parallel configuration) for treating exhaust from a diesel engine, comprising:
 a first exhaust pipe section for carrying exhaust from the exhaust manifold of the engine;
 a first exhaust pipe branch off the first exhaust pipe section;
 a NOx reduction device on the first exhaust pipe branch;
 a second exhaust pipe branch off the first exhaust pipe section;
 a diesel particulate filter (DPF) on the second exhaust pipe branch;
 a first crossover exhaust pipe from an entry point on the first exhaust branch downstream the NOx reduction device to an exit point on the second exhaust branch upstream the (DPF);
 a second crossover exhaust pipe from an entry point on the second exhaust branch downstream the (DPF) to an exit point on the first exhaust branch upstream the NOx reduction device;
 wherein the first exhaust pipe branch and the second exhaust pipe branch have a junction downstream the all entry and exit points of the first crossover pipe and the second crossover pipe;
 a tailpipe for carrying exhaust from the junction to the atmosphere;
 a first pair of on/off valves, one each on the first exhaust pipe branch on the second exhaust pipe branch, upstream all entry and exit points of the first crossover pipe and the second crossover pipe;
 a second pair of on/off valves, one each on the first crossover exhaust pipe and the second crossover exhaust pipe respectively;
 a third pair of on/off valves, one each on the first exhaust pipe branch on the second exhaust pipe branch, downstream all entry and exit points of the first crossover pipe and the second crossover pipe; and
 a control unit programmed to receive a measurement signal representing temperature at the NOx reduction device, and in response to the measurement signal, to generate control signals to the valves to determine whether exhaust shall travel first through the NOx reduction device or first through (DPF);
 wherein the control unit is further programmed to store an upper temperature limit and a lower temperature limit for the NOx reduction device; to store control signals for a default state of the diesel emissions treatment system, in which all exhaust first flows through the NOx reduction device and then all exhaust flows next through the DPF; and to store control signals for a non-default state of the diesel emissions treatment system, in which all exhaust first flows though the DPF and then all exhaust flows next through the NOx reduction device;
 wherein the control unit is further programmed to generate control signals such that upon start-up of the engine or shut down of the engine, the diesel emissions treatment system is in the default state; and during operation of the engine, to determine whether the temperature of the NOx reduction device exceeds the upper temperature limit or if the DPF requires regeneration, and if so, to generate control signals such that the diesel emissions system is in the non-default state; and to determine at any time while the diesel emissions system is in the non-default state, whether the temperature of the NOx reduction device is below the lower temperature limit or if the NOx reduction device requires desulfation, and if so, to generate control signals such that the diesel emissions system returns to the default state;
 wherein the length of the crossover pipe between the inlet of the NOx reduction device and the outlet of the DPF is predetermined to maintain the temperature of the NOx reduction device between the lower temperature limit and the upper temperature limit when the diesel emissions treatment system is in the non default state.

2. The system of claim 1, further comprising an oxidation catalyst on the first exhaust pipe section.

3. The system of claim 1, further comprising an oxidation catalyst on the second exhaust pipe branch upstream the diesel particulate filter.

4. The system of claim 1, wherein the NOx reduction device is one or more of the following devices: a lean NOx trap or selective catalyst reduction device.

5. The system of claim 1, wherein the NOx reduction device and the diesel particulate filter have the same flow inlet and outlet regardless of whether exhaust flows through the Nox reduction device first then the diesel particulate filter or vice versa.

6. A method of controlling the temperature of exhaust from an engine into a NOx reduction device of a diesel emissions treatment system, comprising:
 placing the NOx reduction device and diesel particulate filter (DPF) on parallel exhaust pipes;
 providing two separate crossover pipes from the output end of each pipe to the input end of the other pipe; and
 wherein, by using a system of on/off valves and the crossover pipes, the exhaust flow can be directed first into either the NOx reduction device or the (DPF); and defining an upper temperature limit and a lower temperature limit for the NOx reduction device;

defining a default state of the diesel emissions treatment system, in which all exhaust first flows through the NOx reduction device and then all exhaust flows next through the DPF;

defining a non-default state of the diesel emissions treatment system, in which all exhaust first flows though the DPF and then all exhaust flows next through the NOx reduction device;

during operation of the engine, operating the valves such that the diesel emissions treatment is only in either the default state or non default state;

upon start-up of the engine or shut down of the engine, placing the diesel emissions treatment in default state;

during operation of the engine, determining whether the temperature of the NOx reduction device exceeds the upper temperature limit or if the DPF requires regeneration, and if so, operating the valves such that the diesel emissions system is in the non-default state;

at any time while the diesel emissions system is in the non-default state, determining whether the temperature of the NOx reduction device is below the lower temperature limit or if the NOx reduction device requires desulfation, and if so, operating the valves such that the diesel emissions system returns to the default state;

wherein the length of the crossover pipe between the inlet of the NOx reduction device and the outlet of the DPF is predetermined to maintain the temperature of the NOx reduction device between the lower temperature limit and the upper temperature limit when the diesel emissions treatment system is in the non default state.

7. The method of claim 6, wherein the NOx reduction device and the diesel particulate filter have the same flow inlet and outlet regardless of whether exhaust flows through the NOx reduction device first then the diesel particulate filter or vice versa.

8. The method of claim 6, further comprising placing an oxidation catalyst on the first exhaust pipe section.

9. The method of claim 6, further comprising placing an oxidation catalyst on the second exhaust pipe branch upstream the diesel particulate filter.

10. The method of claim 6, wherein the NOx reduction device is one or more of the following devices: a lean NOx trap or selective catalyst reduction device.

* * * * *